US011567545B2

(12) United States Patent
Lin et al.

(10) Patent No.: US 11,567,545 B2
(45) Date of Patent: Jan. 31, 2023

(54) DISPLAY DEVICE AND FRAME MODULE THEREOF

(71) Applicant: Qisda Corporation, Taoyuan (TW)

(72) Inventors: Jun-Da Lin, New Taipei (TW);
Chun-Ting Chen, Taoyuan (TW);
Yi-Cheng Kuo, Taoyuan County (TW)

(73) Assignee: Qisda Corporation, Taoyuan (TW)

( * ) Notice: Subject to any disclaimer, the term of this patent is extended or adjusted under 35 U.S.C. 154(b) by 110 days.

(21) Appl. No.: 16/846,489

(22) Filed: Apr. 13, 2020

(65) Prior Publication Data

US 2021/0318731 A1 Oct. 14, 2021

(30) Foreign Application Priority Data

Aug. 14, 2019 (TW) .................................. 108129014

(51) Int. Cl.
*G06F 1/18* (2006.01)
*G06F 1/16* (2006.01)

(52) U.S. Cl.
CPC ............ *G06F 1/181* (2013.01); *G06F 1/1609* (2013.01)

(58) Field of Classification Search
CPC ..... G06F 1/181; G06F 1/1609; H05K 5/0013; H05K 5/0017; H05K 5/0052; H05K 7/1007; H05K 7/12; H05K 7/14; H05K 7/18
USPC ..................................................... 361/679.21
See application file for complete search history.

(56) References Cited

U.S. PATENT DOCUMENTS

| 8,040,454 | B2* | 10/2011 | Lee | G02F 1/133308 |
| | | | | 349/58 |
| 8,836,884 | B2* | 9/2014 | Que | H04N 13/30 |
| | | | | 362/633 |
| 10,324,329 | B2* | 6/2019 | Yang | G02B 6/0093 |
| 10,470,321 | B1* | 11/2019 | Davis | H05K 5/0247 |
| 10,969,628 | B1* | 4/2021 | Zweigle | G02F 1/133608 |

(Continued)

FOREIGN PATENT DOCUMENTS

| CN | 102392997 A | | 3/2012 |
| TW | 201339708 A | * | 1/2013 |

(Continued)

OTHER PUBLICATIONS

Office action of counterpart application by Taiwan IP Office dated Nov. 30, 2020.

(Continued)

*Primary Examiner* — Abhishek M Rathod
*Assistant Examiner* — Keith DePew

(57) ABSTRACT

A display device includes a frame module, a display panel, a backlight module, a rear case and a control module. The frame module includes a back plate, a frame and a fixing column. The back plate has a first surface and a second surface opposite to the first surface and a hole extending from the first surface to the second surface. The fixing column is protrudingly disposed on the frame and is coupled to the hole. The fixing column includes a pressing portion and a connecting portion connecting the frame and the pressing portion. The connecting portion is disposed in the hole, and the frame presses against the first surface, and the pressing portion presses against the second surface. The backlight module is disposed between the back plate and the display panel. The control module is disposed between the rear case and the frame module.

18 Claims, 11 Drawing Sheets

(56) References Cited

U.S. PATENT DOCUMENTS

| | | | |
|---|---|---|---|
| 11,127,323 B2 * | 9/2021 | Kim | G09F 9/301 |
| 11,181,683 B2 * | 11/2021 | Shi | G02F 1/133317 |
| 2001/0050731 A1 * | 12/2001 | An | G02F 1/133308 349/58 |
| 2011/0149194 A1 * | 6/2011 | Nakano | G02F 1/133308 349/58 |
| 2011/0211134 A1 * | 9/2011 | Yoshikawa | G02F 1/133615 362/612 |
| 2013/0010214 A1 * | 1/2013 | Cho | G02F 1/133608 362/217.1 |
| 2013/0070475 A1 * | 3/2013 | Youk | G02F 1/133308 362/602 |
| 2013/0128141 A1 * | 5/2013 | Huang | G02F 1/133308 313/582 |
| 2013/0128142 A1 * | 5/2013 | Que | G06F 1/1601 361/679.01 |
| 2013/0128143 A1 * | 5/2013 | Kuo | G02F 1/133385 361/720 |
| 2013/0128144 A1 * | 5/2013 | Que | G02F 1/133308 362/97.1 |
| 2013/0128145 A1 * | 5/2013 | Kuo | G09F 13/04 362/97.1 |
| 2013/0128540 A1 * | 5/2013 | Kuo | H05K 9/0054 211/26 |
| 2013/0128545 A1 * | 5/2013 | Kuo | G02F 1/133308 211/26 |
| 2013/0335668 A1 * | 12/2013 | Tang | G02F 1/133308 349/58 |
| 2014/0347595 A1 * | 11/2014 | Mori | G02F 1/133308 349/58 |
| 2016/0320659 A1 * | 11/2016 | Ma | G02F 1/13 |
| 2017/0123260 A1 * | 5/2017 | Kim | G02F 1/133308 |
| 2017/0308124 A1 * | 10/2017 | Mathew | H04N 5/64 |
| 2018/0063971 A1 * | 3/2018 | Han | F16M 13/02 |
| 2018/0120633 A1 * | 5/2018 | Yang | G02F 1/133524 |
| 2018/0252966 A1 * | 9/2018 | Kumamoto | G09F 9/00 |
| 2021/0026058 A1 * | 1/2021 | Shi | G02B 6/005 |
| 2021/0227704 A1 * | 7/2021 | Bi | H05K 5/0017 |
| 2021/0251088 A1 * | 8/2021 | Su | H05K 5/0013 |

FOREIGN PATENT DOCUMENTS

| | | | |
|---|---|---|---|
| TW | 201339708 A | 10/2013 | |
| TW | 201624078 A | 7/2016 | |
| TW | M568392 U | 10/2018 | |
| TW | 108129014 B | 6/2019 | |
| TW | I662321 B | 6/2019 | |
| WO | WO-2014029122 A1 * | 2/2014 | G02F 1/133308 |

OTHER PUBLICATIONS

Office action of counterpart application by Taiwan IP Office dated Jun. 18, 2020.

* cited by examiner

DISPLAY DEVICE AND FRAME MODULE THEREOF

This application claims the benefit of Taiwan application Serial No. 108129014, filed Aug. 14, 2019, the subject matter of which is incorporated herein by reference.

BACKGROUND OF THE INVENTION

Field of the Invention

The present disclosure relates to a device and a frame module thereof, and more particularly to a display device and a frame module thereof.

Description of the Related Art

The conventional display device includes a frame module, and the frame module includes a plurality of components. These components are usually combined with each other by second injection molding technology. However, the thickness of the frame module formed by such a combination method is thick, and it is difficult to reduce the thickness of the frame module. Therefore, there is a need to propose a technology capable of thinning the frame module.

SUMMARY OF THE INVENTION

The invention is directed to a display device and a frame module thereof capable of resolving the abovementioned problems encountered in the prior art.

According to an embodiment of the present invention, a display device is provided. The display device includes a frame module, a display panel, a backlight module, a rear case and a control module. The frame module includes a back plate, a frame and a first fixing post. The back plate has a first surface and a second surface opposite to the first surface and a first hole extending from the first surface to the second surface. The first fixing post is protrudingly disposed on the frame and coupled to the first hole, wherein the first fixing post includes a first connecting portion and a first pressing portion, the first connecting portion connects the frame to the first pressing portion, the first connecting portion penetrates through the first hole, the frame presses against the first surface, and the first pressing portion presses against the second surface. The display panel is disposed on the frame. The backlight module is disposed between the back plate and the display panel. The rear case is disposed on the frame. The control module is disposed between the rear case and the frame module.

According to another embodiment of the present invention, a frame module, suitable for being disposed between a display panel of a display device and a rear case of the display device, is provided. The frame module includes a back plate, a frame and a first fixing post. The back plate has a first surface and a second surface opposite to the first surface and a first hole, wherein the first hole extends from the first surface to the second surface. The first fixing post is protrudingly disposed on the frame and coupled to the first hole, the first fixing post includes a first connecting portion and a first pressing portion, the first connecting portion connects the frame to the first pressing portion, the first connecting portion penetrates through the first hole, the frame presses against the first surface, and the first pressing portion presses against the second surface.

According to another embodiment of the present invention, a frame module, suitable for being disposed between a display panel of a display device and a rear case of the display device, is provided. The frame module includes a back plate, a frame and a first fixing post. The back plate has a first surface and a second surface opposite to the first surface and a first hole, wherein the first hole extends from the first surface to the second surface. The first fixing post is protrudingly disposed on the frame and coupled to the first hole, the first fixing post includes a first connecting portion and a first pressing portion, the first connecting portion connects the frame to the first pressing portion, the first connecting portion penetrates through the first hole, the frame presses against the first surface, and the first pressing portion presses against the second surface.

According to another embodiment of the present invention, a display device is provided. The display device includes a frame module, a display panel, a backlight module, a rear case and a control module. The frame module includes a back plate, a frame and an adhesive layer. The adhesive layer is formed between the back plate and the frame, and bonds the back plate and the frame. The display panel is disposed on the frame. The backlight module is disposed between the back plate and the display panel. The rear case is disposed on the frame. The control module is disposed between the rear case and the frame module.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3B shows an enlarged view of a part 3B' of the display device in

FIG. 3A;

DETAILED DESCRIPTION OF THE INVENTION

Figure 1:
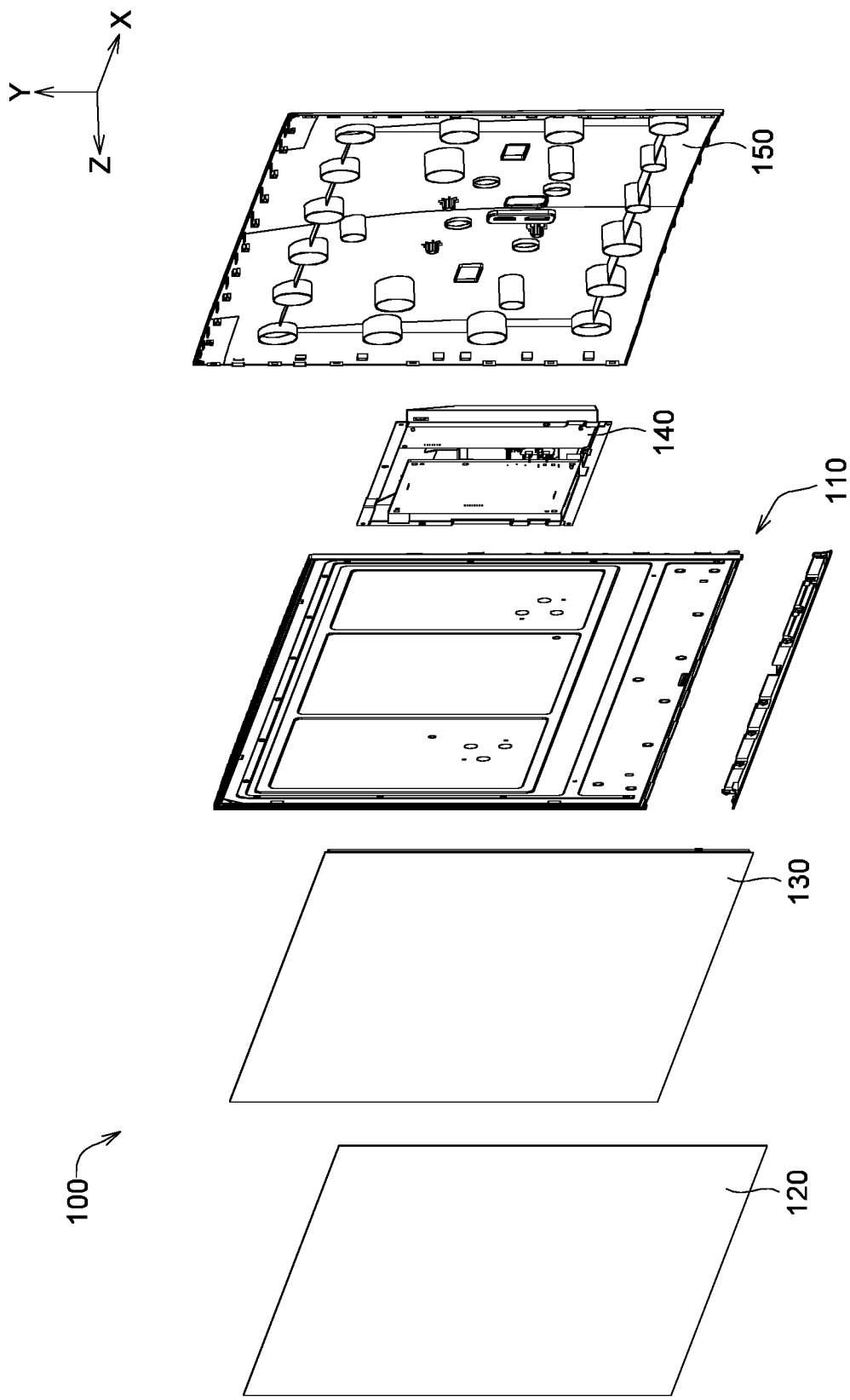
FIG. 1 shows an exploded view of a display device according to an embodiment of the present invention.
Figure 2:
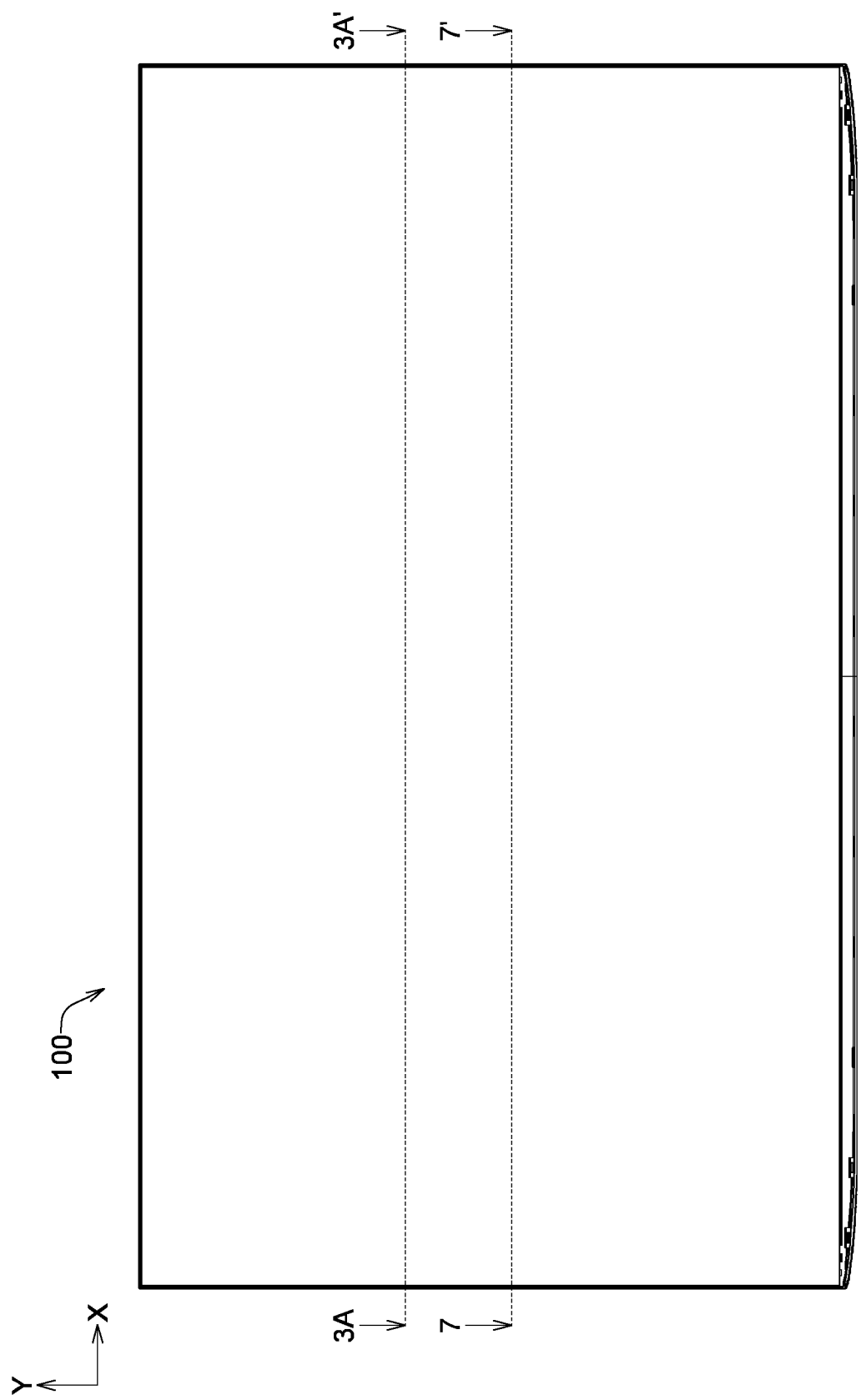
FIG. 2 shows an assembly view of the display device of FIG. 1.
Figure 3A:
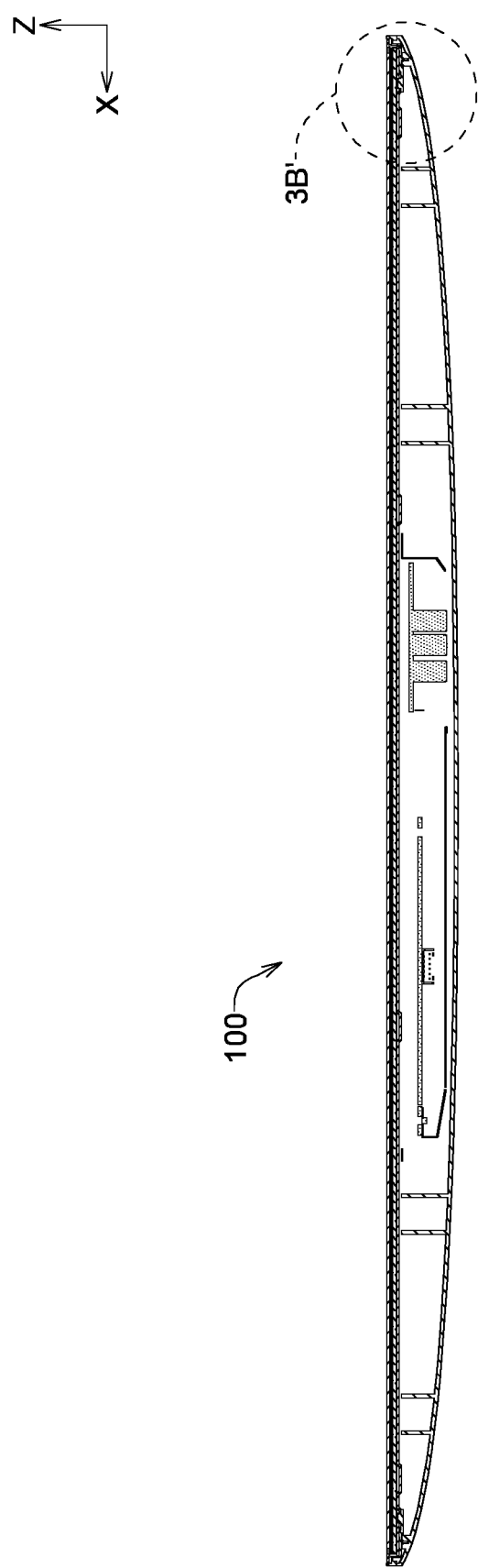
FIG. 3A shows a cross-sectional view of the display device of FIG. 2 taken along direction 3A-3A'.
Figure 3B:
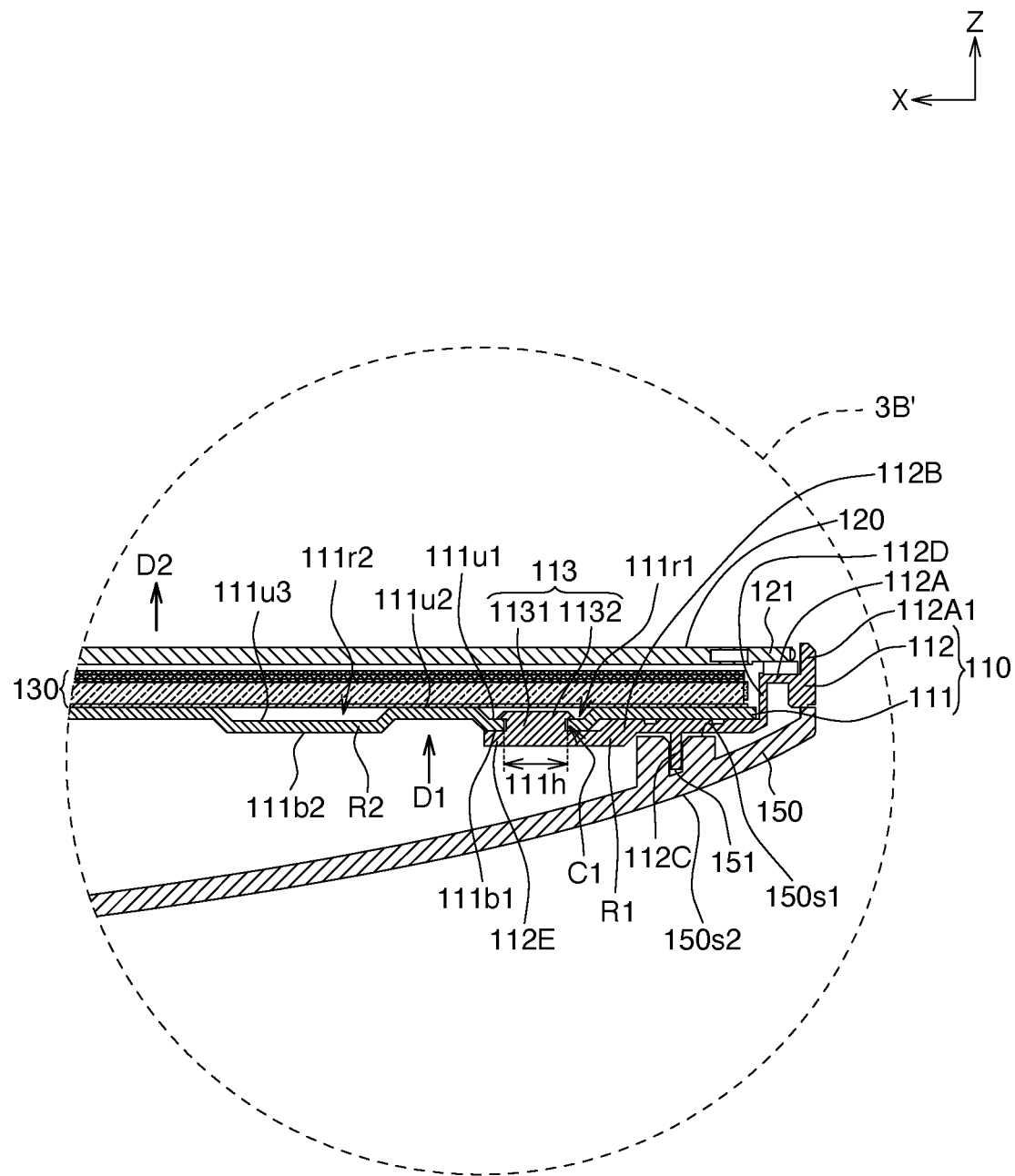
Figure 4:
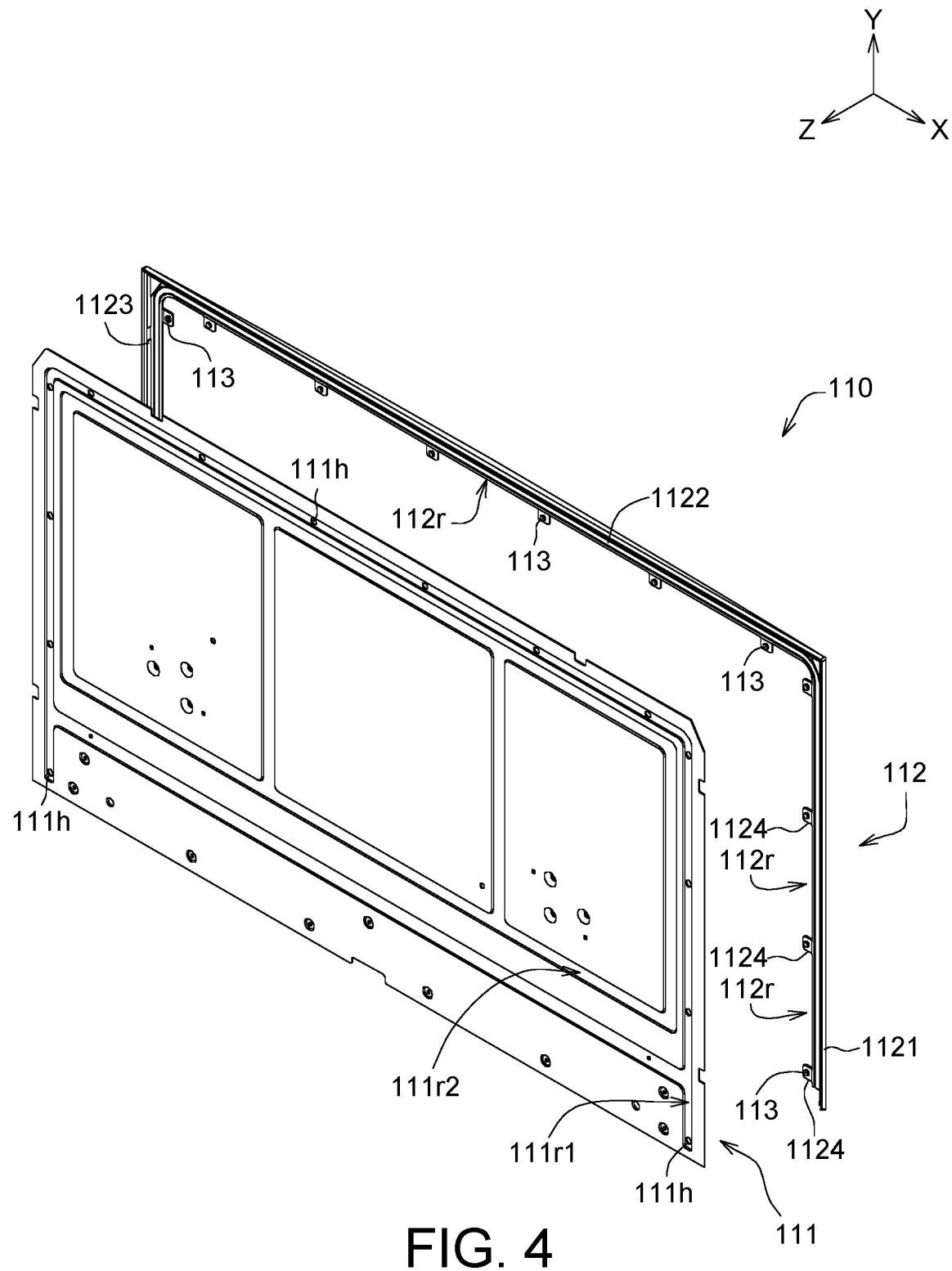
FIG. 4 shows an exploded view of a frame module of FIG. 1.
Figure 5:
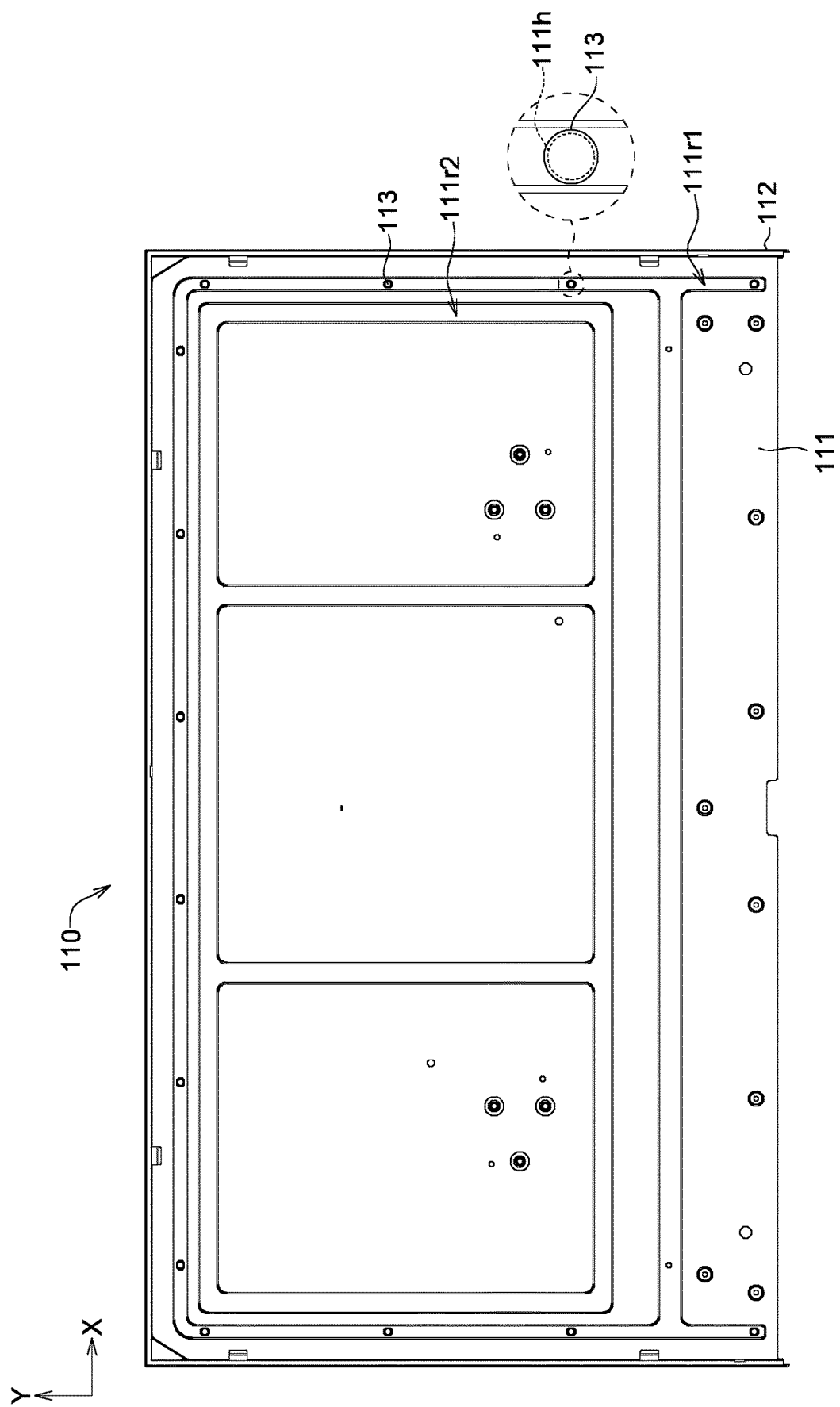
FIG. 5 shows a front view of the frame module of FIG. 1 viewed in the −Z direction.
Figure 6:
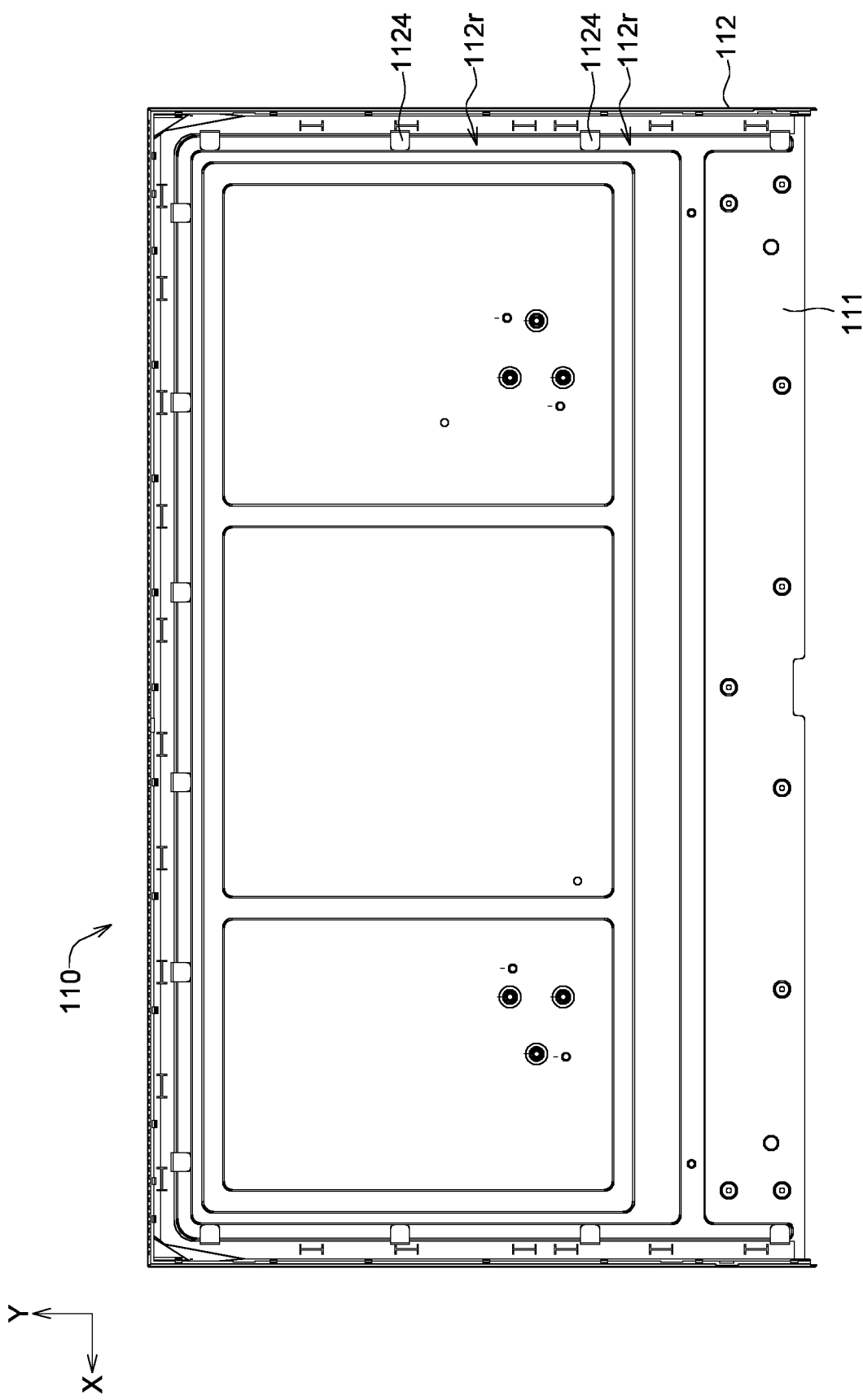
FIG. 6 shows a front view of the frame module of FIG. 1 viewed in the +Z direction.
Figure 7:
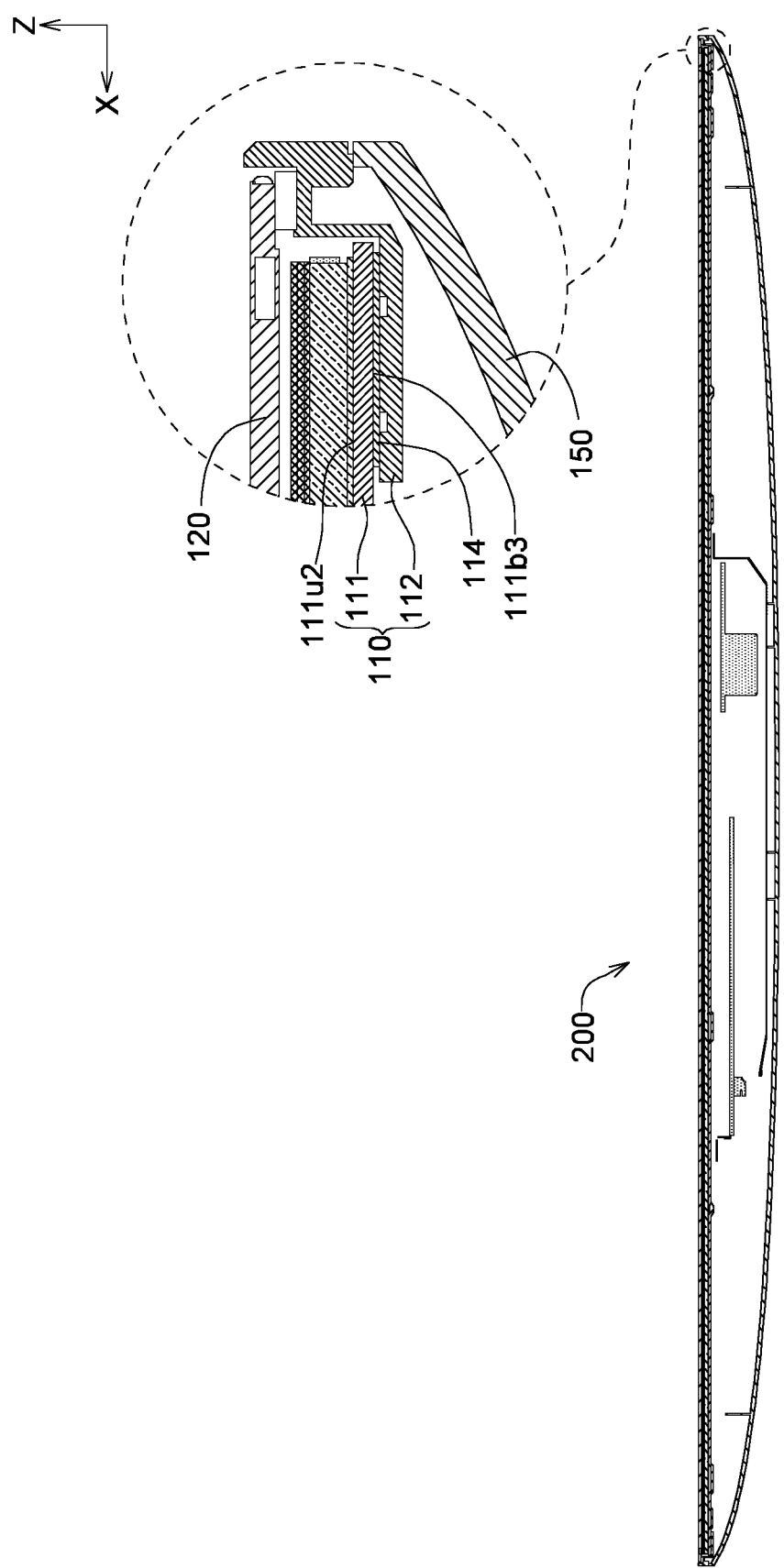
FIG. 7 shows a cross-sectional view of the display device in FIG. 2 taken along direction 7-7'.

Referring to FIG. 1 to FIG. 7, FIG. 1 shows an exploded view of a display device 100 according to an embodiment of the present invention, FIG. 2 shows an assembly view of the display device 100 of FIG. 1, FIG. 3A shows a cross-sectional view of the display device 100 of FIG. 2 taken along direction 3A-3A', FIG. 3B shows an enlarged view of a part 3B' of the display device 100 in FIG. 3A, and FIG. 4 shows an exploded view of a frame module 110 of FIG. 1, FIG. 5 shows a front view of the frame module 110 of FIG. 1 viewed in −Z direction, FIG. 6 shows a front view of the frame module 110 of FIG. 1 viewed in the +Z direction, and FIG. 7 shows a cross-sectional view of the display device 100 in FIG. 2 taken along direction 7-7'.

The Z direction in the figure is, for example, perpendicular to a display surface of the display device 100, the X direction is parallel to an edge of the display device 100, for example, one of a long edge and a short edge of the display device 100, and the Y direction is parallel to an adjacent edge of the display device 100, for example, another of the long edge and the short edge of the display device 100.

As shown in FIGS. 1 to 3B, the display device 100 includes the frame module 110, a display panel 120, a backlight module 130, a control module 140, and a rear case 150. As shown in FIGS. 3A and 3B, the display panel 120 is disposed on a frame 112, and the backlight module 130 is disposed between a back plate 111 and the display panel 120. The rear case 150 is coupled to (for example, engaged with) the frame 112 of the frame module 110. The control module 140 is disposed between the rear case 150 and the frame module 110 and is electrically connected to the display panel 120 and the backlight module 130 to control the display panel 120 and the backlight module 130.

As shown in FIGS. 3A and 3B, the frame module 110 includes the back plate 111, the frame 112, at least one first fixing post 113 and an adhesive layer 114 (the adhesive layer 114 is shown in FIG. 7). The back plate 111 has a first surface 111b1 and a second surfaces 111u1 opposite to the first surface 111b1 and at least one first hole 111h. The first hole 111h extends from the first surface 111b1 to the second surface 111u1, that is, the first hole 111h penetrates the back plate 111. The first fixing post 113 is protrudingly disposed on the frame 112 and is coupled to the first hole 111h. Each of the first fixing posts 113 includes a first connecting portion 1131 and a first pressing portion 1132. The first connecting portion 1131 connects the frame 112 and the first pressing portion 1132. The first connecting portion 1131 penetrates through the first hole 111h. In this embodiment, the frame 112 presses against the first surface 111b1, and the first pressing portion 1132 presses against the second surface 111u1, so that relative position of the frame 112 and the back plate 111 could be fixed. In addition, the frame module 110 is disposed between the rear case 150 and the display panel 120. The frame 112 directly connects the back plate 111 and the rear case 150. In an embodiment, the frame 112 includes a first end portion 112A, a second end portion 112B, a first engaging portion 112C, a first position-limited portion 112D and the first fixing post 113, wherein the first end portion 112A is coupled to an end portion 121 of the display panel 120, and the first engaging portion 112C is connected with a first surface 150s1 of the rear case 150, wherein a second surface 150s2 of the rear case 150 is exposed from the display device 100. A portion (for example, a second position-limited portion 112A1) of the first end portion 112A is exposed from the display device 100, and the second end portion 112B includes the first fixing post 113. The rear case 150 further includes a second engaging portion 151 disposed on the first surface 150s1 and engaged with the first engaging portion 112C. The first position-limited portion 112D is connected with the second end portion 112B and faces a side of the back plate 111. The second position-limited portion 112A1 faces a lateral surface of the display panel 120. In addition, the frame 112 further includes a clamping portion 112E, wherein the clamping portion 112E is disposed between the back plate 111 and the rear case 150, the clamping portion 112E presses against the first surface 150s1, the first connecting portion 1131 extends from the clamping portion 112E of the frame 112 to pass through the first hole 111h of the back plate 111 in a direction D1 away from the rear case 150, and the first pressing portion 1132 and the clamping portion 112E of the frame 112 clamp the back plate 111. The first hole 111h is located between the backlight module 130 and the rear case 150 in a displaying direction D2 of the display panel 120.

In an embodiment, the frame 112, the first connecting portion 1131 and the first pressing portion 1132 could be integrated into one piece, and the frame 112, the first connecting portion 1131 and the first pressing portion 1132 could be made of material, for example, insulation material, such as plastic. In terms of manufacturing process, the frame 112, the first connecting portion 1131 and the first pressing portion 1132 could be formed by an injection molding process. In addition, the back plate 111 is, for example, a metal sheet piece, such as an iron piece, an aluminum piece, or the like. In terms of manufacturing process, the back plate 111 could be made by a sheet metal working method. In other embodiments, the back plate 111 could be an insulation back plate, such as a plastic back plate.

In this embodiment, the first pressing portion 1132 of the first fixing post 113 is formed by a hot-melt method. In detail, before the hot-melt, the first fixing post 113 has not formed the first pressing portion 1132 with an enlarged outer diameter, and the first fixing post 113 is a straight post, wherein the cross-sectional shape of the straight post is substantially the same as the cross-sectional shape of the first connecting portion 1131. After the straight post passes through the first hole 11h, the end of the straight post is heated and pressed to soften the end of the straight post to form the first pressing portion 1132 with an enlarged outer diameter. In addition, under pressing the straight post, the first pressing portion 1132 makes the back plate 111 pressed against the frame 112, wherein the frame 112 presses against the first surface 111b1, and the first pressing portion 1132 presses against the second surface 111u1 to fix the relative position between the frame 112 and the back plate 111. Compared with the method of forming the frame module 110 by using the secondary injection molding technology or in-mold injection technology, the method of combining the back plate 111 and the frame 112 by using the hot-melt method could obtain a thin frame module 110. In addition, the top-viewed shape (as viewed in the −Z direction) of the first pressing portion 1132 is similar to the shape of the end surface of the straight post. For example, when the shape of the end surface of the straight post is circular, the top-viewed shape of the first pressing portion 1132 is also circular, but it could also be extruded to be shaped into an oval shape.

As shown in FIG. 4, the shape of the first hole 111h is circular, but it could also be a polygon, such as a triangle, a rectangle, a square or an oval. The cross-sectional shape of the first connecting portion 1131 of the first fixing post 113 is similar to or the same as that of the first hole 111h. However, as long as the first pressing portion 1132 could be formed to make the back plate 111 press against the frame 112, the embodiment of the present invention is not limited to the shape of the first hole 111h and the cross-sectional shape of the first connecting portion 1131.

As shown in FIGS. 3A and 3B, the back plate 111 further has a carrying surface 111u2 and a first recessed portion 111r1, the backlight module 130 is disposed on the carrying surface 111u2, and the first recessed portion 111r1 extends from the carrying surface 111u2 toward the rear case 150 to form the second surface 111u1 (the second surface 111u1 is bottom surface of the first recessed portion 111r1), and the first pressing portion 1132 is located within the first recessed portion 111r1. In this embodiment, the first pressing portion 1132 does not exceed the carrying surface 111u2 (that is, the entire first pressing portion 1132 is located within the first recessed portion 111r1) to avoid interference with the backlight module 130. In addition, the first recessed portion 111r1 could include or form a first rib R1, and it could increase overall strength of the back plate 111.

As shown in FIGS. 3A and 3B, there is a clearance C1 between the first hole 111h and the first connecting portion 1131. As a result, before the hot-melt, the aforementioned straight post could easily pass through the first hole 111h, so that the assembly of the back plate 111 and the frame 112 could be improved.

As shown in FIGS. 3A and 3B, the back plate 111 further has a second recessed portion 111r2, and the second recessed portion 111r2 extends from the carrying surface 111u2 toward the rear case 150. The second recessed portion 111r2 and the first recessed portion 111r1 are staggered with each other and disconnected from each other, and the second recessed portion 111r2 is closer to center of the back plate 111 than the first recessed portion 111r1. As shown in the figure, the second recessed portion 111r2 could include or form a second rib R2, and it could increase the overall strength of the back plate 111.

As shown in FIG. 4, the frame 112 includes a first frame edge 1121, a second frame edge 1122 and a third frame edge 1123, wherein the second frame edge 1122 connects the first frame edge 1121 with the third frame edge 1123, the first frame edge 1121 is parallel to the third frame edge 1123, and the second frame edge 1122 is substantially perpendicular to the first frame edge 1121 and the third frame edge 1123, so that the first frame edge 1121, The second frame edge 1122 and the third frame edge 1123 constitute an inverted U-shaped frame. The number of the first fixing posts 113 of the frame module 110 is plural, wherein the first fixing posts 113 are disposed on at least one of the first frame edge 1121, the second frame edge 1122 and the third frame edge 1123, and are arranged along extension direction of at least one of the first frame edge 1121, the second frame edge 1122 and the third frame edge 1123. In this embodiment, the first frame edge 1121, the second frame edge 1122 and the third frame edge 1123 form an inverted-U shaped frame.

Therefore, a plurality of first fixing posts 113 disposed in the inverted-U shaped frame is also arranged in an inverted-U shape. In another embodiment, a plurality of frames could be connected to form a closed-ring frame, and the first fixing posts 113 are disposed on at least one of the frames. In addition, the number of the first holes 111h of the back plate 111 is plural, and each of the first fixing posts 113 is coupled to the corresponding first hole 111h.

As shown in FIGS. 4 and 6, the frame 112 has a plurality of notches 112r, and one notch 112r is formed between two adjacent first fixing posts 113. After a notch 112r is formed, the frame 112 forms two extension portions 1124 on two sides of the notch 112r, and the two first fixing posts 113 are disposed on the two extension portions 1124 respectively. The notch 112r could reduce the material of the frame 112 to save the weight of the frame 112 and make the frame module 110 lightweight. In addition, the gap 112r could also reduce the amount of the material of the frame 112 to reduce the material cost of the frame 112.

As shown in FIG. 7, an adhesive layer 114 is formed between the back plate 111 and the frame 112 to bond the back plate 111 and the frame 112. For example, the back plate 111 has a rear surface 111b3 opposite to the carrying surface 111u2, wherein the adhesive layer 114 is formed between the rear surface 111b3 of the back plate 111 and the frame 112. The adhesive layer 114 could increase the fixation between the back plate 111 and the frame 112. In another embodiment, the frame module 110 could omit the adhesive layer 114. In other embodiments, the frame module 110 could omit the first fixing post 113 and the first hole 111h.

Figure 8:
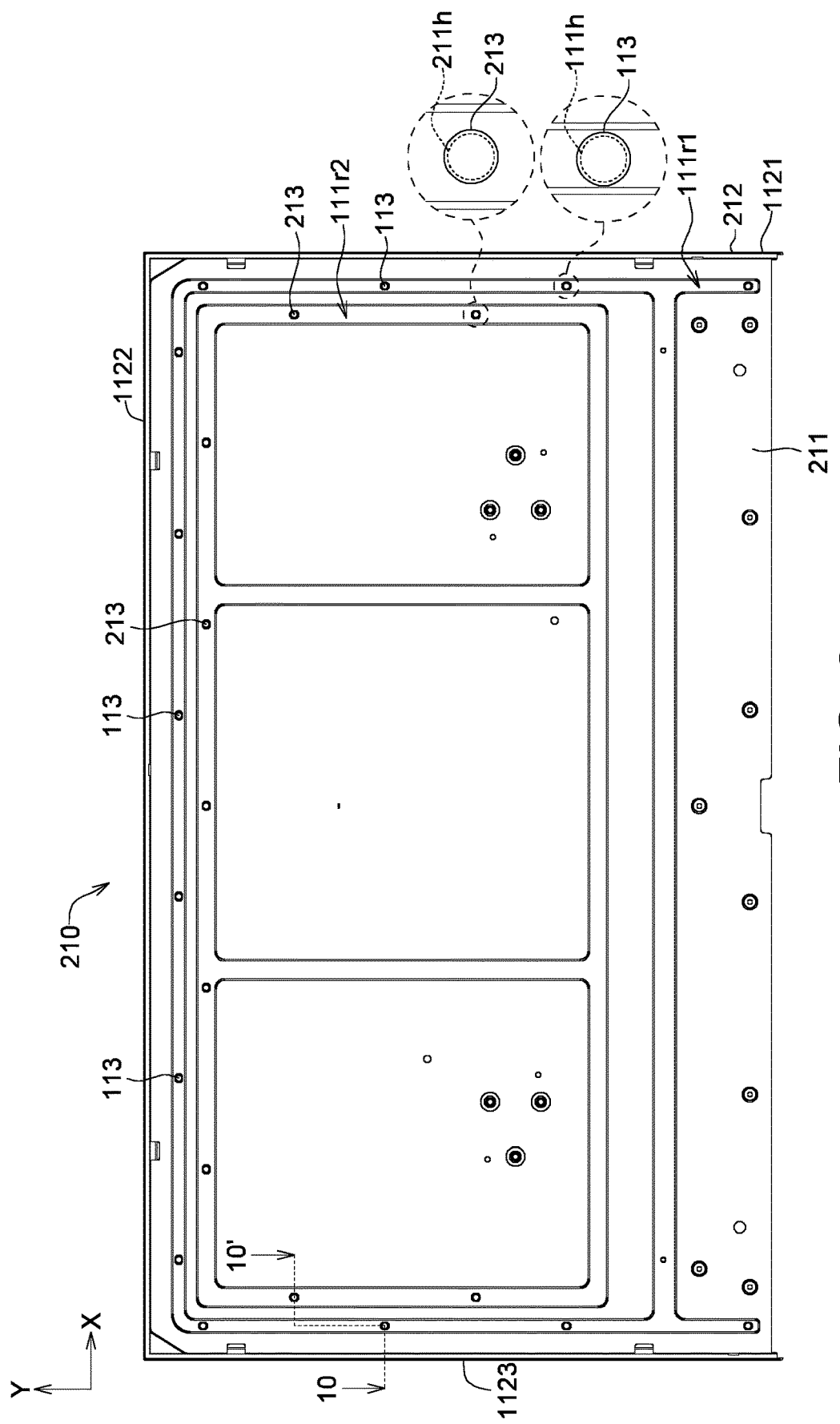
FIG. 8 shows a front view of the frame module viewed in the −Z direction according to another embodiment of the present invention.
Figure 9:
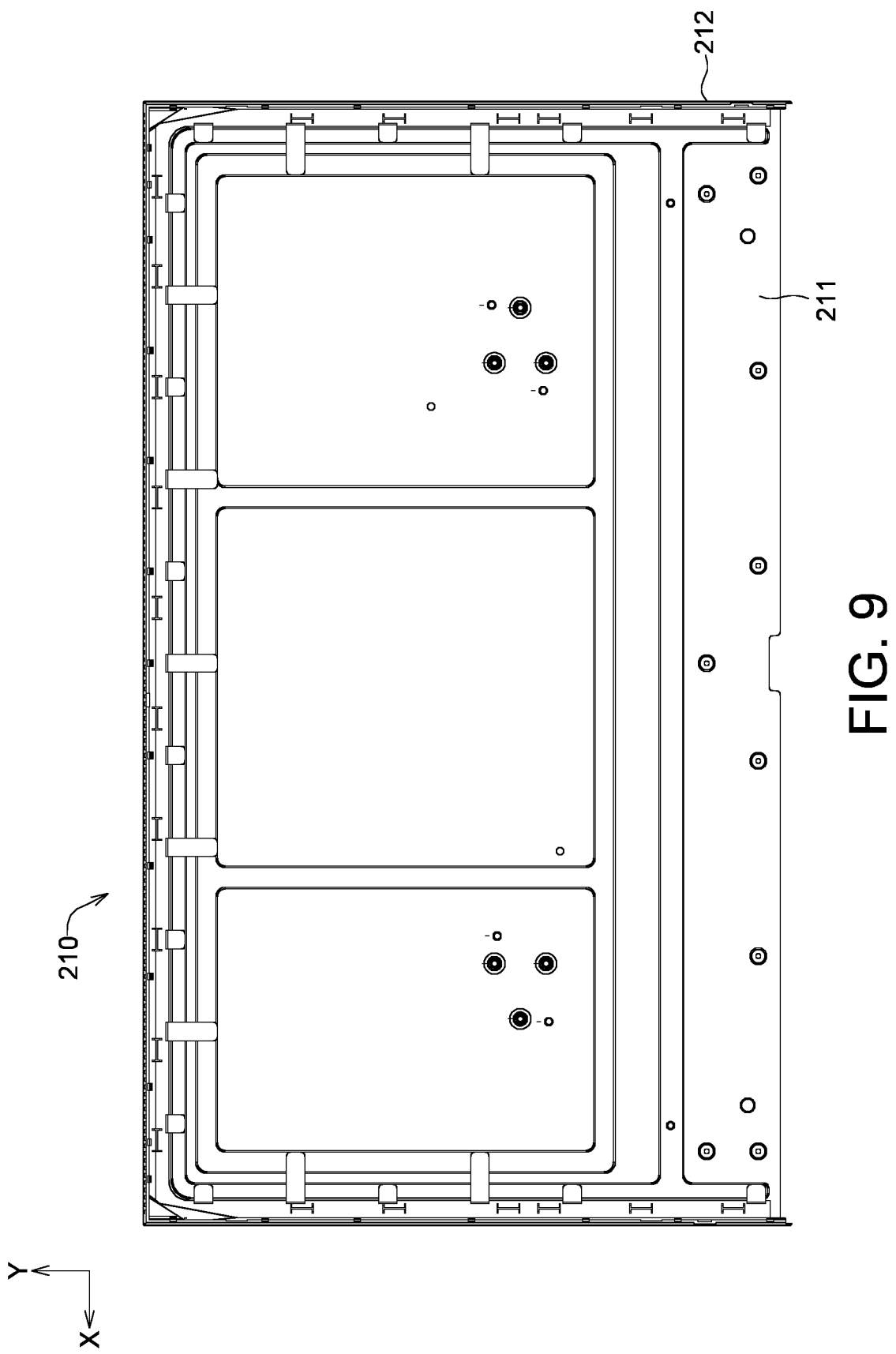
FIG. 9 shows a front view of the frame module of FIG. 8 viewed in +Z direction.
Figure 10:
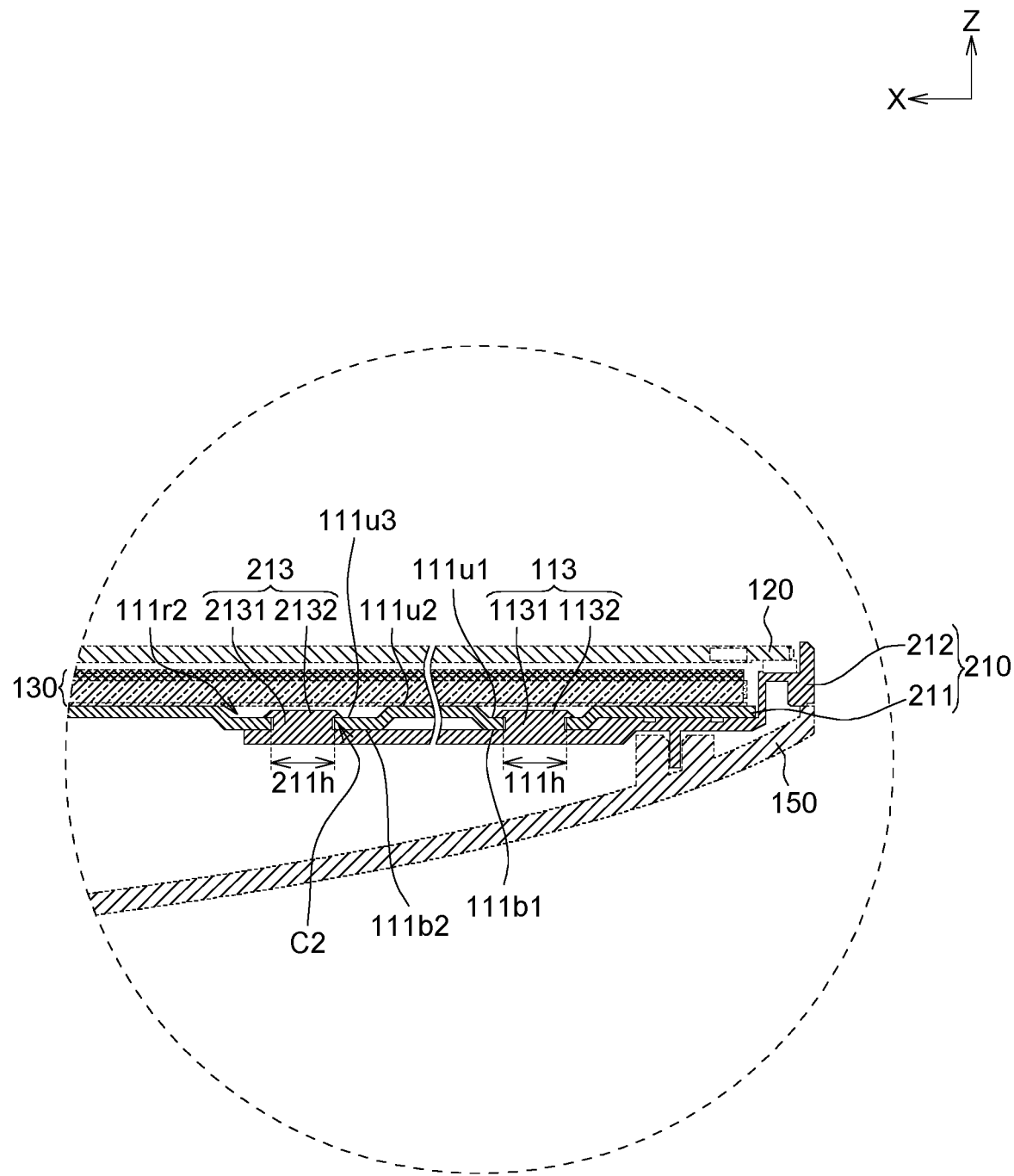
FIG. 10 is a cross-sectional view of the frame module of FIG. 8 along the direction 10-10'.

Referring to FIGS. 8 to 10, FIG. 8 shows a front view of the frame module 210 viewed in the −Z direction according to another embodiment of the present invention, FIG. 9 shows a front view of the frame module 210 of FIG. 8 viewed in +Z direction, and FIG. 10 is a cross-sectional view of the frame module 210 in FIG. 8 along the direction 10-10'.

The frame module 110 of the display device 100 could be replaced by a frame module 210. The frame module 210 has a structure similar to or the same as that of the frame module 110, except that a plurality of fixed posts of the frame module 210 is arranged in several rows.

The frame module 210 includes a back plate 211, a frame 212, at least one the first fixing post 113, at least one second fixing post 213 and the adhesive layer 114 (not shown). In another embodiment, the frame module 210 could omit the adhesive layer 114, or omit the first fixing post 113 and the second fixing pillar 213.

As shown in FIG. 10, the back plate 211 has the first surface 111b1 and the second surface 111u1 opposite to the first surface 111b1, a third surface 111b2 and a fourth surface 110u2 opposite to the third surface 111b2, the carrying surface 111u2, at least one first hole 111h, and at least one second hole 211h, the first recessed portion 111r1 and the second recessed portion 111r2. The first recessed portion 111r1 is recessed from the carrying surface 111u2 toward the rear case 150 to form the second surface 111u1. The second recessed portion 111r2 is recessed from the carrying surface 111u2 toward the rear case 150 to form the fourth surface 110u2. The first hole 111h extends from the first surface 111b1 to the second surface 111u1, that is, the first hole 111h penetrates the back plate 211. The second hole 211h extends from the third surface 111b2 to the fourth surface 111u3, that is, the second hole 211h penetrates the back plate 211.

As shown in FIG. 10, the second fixing post 213 is protrudingly disposed on the frame 212 and is coupled to the second hole 211h. Each of the second fixing posts 213 includes a second connecting portion 2131 and a second pressing portion 2132, wherein the second connecting portion 2131 connects the frame 212 with the second pressing portion 2132, and the second connecting portion 2131 passes through the second hole 211h. In this embodiment, the frame 212 presses against the third surface 111b2, and the second pressing portion 2132 presses against the fourth surface 111u3, so that the relative position of the frame 212 and the back plate 211 could be fixed. In addition, the second pressing portion 2132 of the second fixing post 213 could be formed by, for example, a hot-melt method, and the forming process thereof is similar to or the same as that of the first fixing post 113 described above, and details are not described herein again.

As shown in FIG. 10, the second pressing portion 2132 is located in the second recessed portion 111r2. In this embodiment, the second pressing portion 2132 does not exceed the carrying surface 111u2 (that is, the entire second pressing portion 2132 is located within the second recessed portion 111r2) to avoid interference with the backlight module 130. As shown in FIG. 10, there is a clearance C2 between the second hole 211h and the second connecting portion 2131. As a result, the second fixing post 213 (straight post) before hot-melting easily passes through the second hole 211*h*, and it could improve the assembly of the back plate 211 and the frame 212 (before hot-melt).

As shown in FIG. 8, the first fixing posts 113 are arranged in a straight line along the first recessed portion 111*r*1, the second fixing posts 213 are arranged in a straight line along the second recessed portion 111*r*2, and several first fixings posts 113 and several second fixing posts 213 are respectively arranged in two rows. As shown in the figure, a row in which the first fixing posts 113 are arranged surrounds a row in which the second fixing posts 213 are arranged. In addition, several first fixing posts 113 could be arranged along the extending direction of several frame edges of the frame 212 (such as the first frame edge 1121, the second frame edge 1122, and the third frame edge 1123). Similarly, several second fixing posts 213 are also arranged along the extending direction of several frame edges of the frame 212. In this embodiment, the frame 212 is an inverted U-shaped frame. Therefore, several first fixed posts 113 and several second fixed posts 213 arranged in accordance with the inverted U-shaped frame are also arranged in an inverted U-shape.

As shown in FIG. 8, the first fixing post 113 and the second fixing post 213 are staggered in the Y direction, that is, they are arranged in an offset manner. For example, a first fixing post 113 is located between two adjacent second fixing posts 213 along the X direction, or a second fixing post 213 is located between two adjacent first fixing posts 113 along the X direction. In addition, the arrangements of the first holes 111*h* are the same as that of the first fixing posts 113 for combining with the first fixing posts 113, while the arrangements of the second holes 211*h* are the same as that of the two fixing posts 213 for combining with the second fixing post 213. In addition, as shown in the figure, a row in which the first holes 111*h* are arranged surrounds a row in which the second holes 211*h* are arranged.

Although the above embodiment is described by using several fixing posts arranged in two rows (for example, one row in which several first fixing posts 113 are arranged and one row in which several second fixing posts 213 are arranged). In another embodiment, several fixing posts could also be arranged side by side or in an offset manner in rows more than two, for example, three or more. In addition, although the above embodiment is described by taking two staggered recessed portions (for example, the first recessed portion 111*r*1 and the second recessed portion 111*r*2) as an example, the number of recessed portions in another embodiment could be one, three, or more.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprises:
   a rear case;
   a display panel;
   a frame module, disposed between the rear case and the display panel and comprising:
   a back plate having a first surface and a second surface opposite to the first surface and a first hole extending from the first surface to the second surface; and
   a frame directly connecting the back plate and the rear case, and the frame comprises:
   a clamping portion disposed between the back plate and the rear case, the clamping portion presses against the first surface;
   an end portion coupled to an end portion of the display panel;
   a first engaging portion connected with the rear case; and
   a first fixing post protrudingly disposed on a surface of the clamping portion and coupled to the first hole, wherein the first fixing post comprises a first connecting portion and a first pressing portion, the first connecting portion connects the frame to the first pressing portion, the first connecting portion penetrates through the first hole, the first pressing portion presses against the second surface, the first connecting portion extends from the clamping portion of the frame to pass through the first hole of the back plate in a direction away from the rear case, and the first pressing portion and the clamping portion of the frame clamp the back plate;
   a backlight module disposed between the back plate and the display panel; and
   a control module disposed between the rear case and the frame module;
   wherein the frame and the first fixing post are integrated into one piece, and the second surface faces the backlight module;
   wherein the first hole is located between the backlight module and the rear case in a displaying direction of the display panel.

2. The display device according to claim 1, wherein the back plate further has a carrying surface and a first recessed portion, the backlight module is disposed on the carrying surface, the first recessed portion extends from the carrying surface to form the second surface, and the first pressing portion is located within the first recessed portion.

3. The display device according to claim 2, wherein the back plate further has a third surface and a fourth surface opposite to the third surface and a second hole, the second hole extends from the third surface to the fourth surface, and the frame module further comprises:
   a second fixing post protrudingly disposed on the frame and coupled to the second hole, wherein the second fixing post comprises a second connecting portion and a second pressing portion, the second connecting portion connects the frame with the second pressing portion, the second connecting portion penetrates through the second hole, the frame presses against the third surface, and the second pressing portion presses against the fourth surface.

4. The display device according to claim 1, wherein the frame module comprises a plurality of the first fixing posts and a plurality of second fixing posts, and the first fixing posts and the second fixing posts are respectively arranged in two rows in an offset manner.

5. The display device according to claim 1, wherein the frame comprises a first frame edge, a second frame edge and a third frame edge, the second frame edge connects the first frame edge and the third frame edge, the first frame edge is parallel to the third frame edge, the frame module comprises a plurality of the first fixing posts disposed on at least one of the first frame edge, the second frame edge and the third frame edge, the back plate further comprises a plurality of the first holes, and each of the fixing posts is combined with the corresponding first hole.

6. The display device according to claim 1, wherein the end portion of the frame is exposed from the display device.

7. The display device according to claim 1, wherein the frame is made of plastic.

8. A frame module, suitable for being disposed between a display panel of a display device and a rear case of the display device, comprises:
- a back plate having a first surface and a second surface opposite to the first surface and a first hole, wherein the first hole extends from the first surface to the second surface;
- a frame directly connecting the back plate and the rear case, and the frame comprises:
  - a clamping portion disposed between the back plate and the rear case, the clamping portion presses against the first surface;
  - an end portion coupled to an end portion of the display panel;
  - a first engaging portion connected with the rear case; and
  - a first fixing post protrudingly disposed on a surface of the clamping portion and coupled to the first hole, wherein the first fixing post comprises a first connecting portion and a first pressing portion, the first connecting portion connects the frame to the first pressing portion, the first connecting portion penetrates through the first hole, the first pressing portion presses against the second surface, the first connecting portion extends from the clamping portion of the frame to pass through the first hole of the back plate in a direction away from the rear case, and the first pressing portion and the clamping portion of the frame clamp the back plate;
- wherein the frame and the first fixing post are integrated into one piece, and the second surface faces a backlight module;
- wherein the first hole is located between the backlight module and the rear case in a displaying direction of the display panel.

9. The frame module according to claim 8, wherein the back plate further has a carrying surface and a first recessed portion, the first recessed portion extends from the carrying surface to form the second surface, and the first pressing portion is located within the first recessed portion.

10. The frame module according to claim 9, wherein the back plate further has a third surface and a fourth surface opposite to the third surface and a second hole, the second hole extends from the third surface to the fourth surface, and the frame module further comprises:
- a second fixing post protrudingly disposed on the frame and coupled to the second hole, wherein the second fixing post comprises a second connecting portion and a second pressing portion, the second connecting portion connects the frame with the second pressing portion, the second connecting portion penetrates through the second hole, the frame presses against the third surface, and the second pressing portion presses against the fourth surface.

11. The frame module according to claim 8, wherein the frame module comprises a plurality of the first fixing posts and a plurality of second fixing posts, and the first fixing posts and the second fixing posts are respectively arranged in two rows in an offset manner.

12. The frame module according to claim 8, wherein the frame comprises a first frame edge, a second frame edge and a third frame edge, the second frame edge connects the first frame edge and the third frame edge, the first frame edge is parallel to the third frame edge, the frame module comprises a plurality of the first fixing posts disposed on at least one of the first frame edge, the second frame edge and the third frame edge, the back plate further comprises a plurality of the first holes, and each of the fixing posts is combined with the corresponding first hole.

13. The frame module according to claim 8, wherein the end portion of the frame is exposed from the display device.

14. The frame module according to claim 8, wherein the frame is made of plastic.

15. A display device, comprises:
- a rear case;
- a display panel;
- a back plate disposed between the rear case and the display panel, and the back plate has a first surface and a second surface opposite to the first surface and a first hole extending from the first surface to the second surface;
- a frame comprising:
  - a clamping portion disposed between the back plate and the rear case, the clamping portion presses against the first surface;
  - a first end portion coupled to an end portion of the display panel, wherein a portion of the first end portion is exposed from the display device;
  - a first engaging portion connected with a first surface of the rear case, wherein a second surface of the rear case is exposed from the display device; and
  - a second end portion comprising a first fixing post protrudingly disposed on a first surface of the clamping portion and coupled to the first hole, wherein the first fixing post comprises a first connecting portion and a first pressing portion, the first connecting portion connects the frame to the first pressing portion, the first connecting portion penetrates through the first hole, the first pressing portion presses against the second surface, the first connecting portion extends from the clamping portion of the frame to pass through the first hole of the back plate in a direction away from the rear case, and the first pressing portion and the clamping portion of the frame clamp the back plate; and
- a backlight module disposed between the back plate and the display panel, wherein the second surface faces the backlight module;
- wherein the first hole is located between the backlight module and the rear case in a displaying direction of the display panel.

16. The display device according to claim 15, wherein the frame further comprises:
- a first position-limited portion connected with the second end portion and facing a side of the back plate.

17. The display device according to claim 15, wherein the portion of the first end portion is a second position-limited portion facing a lateral surface of the display panel.

18. The display device according to claim 15, wherein the rear case further comprises a second engaging portion disposed on the first surface and engaged with the first engaging portion.

* * * * *